July 11, 1933.  J. HARTNESS  1,917,301
SCREW THREAD GAUGE
Filed Dec. 11, 1929  2 Sheets-Sheet 1

Inventor:
James Hartness.
by Wright, Brown, Quinby & May
Attys.

July 11, 1933.  J. HARTNESS  1,917,301
SCREW THREAD GAUGE
Filed Dec. 11, 1929  2 Sheets-Sheet 2
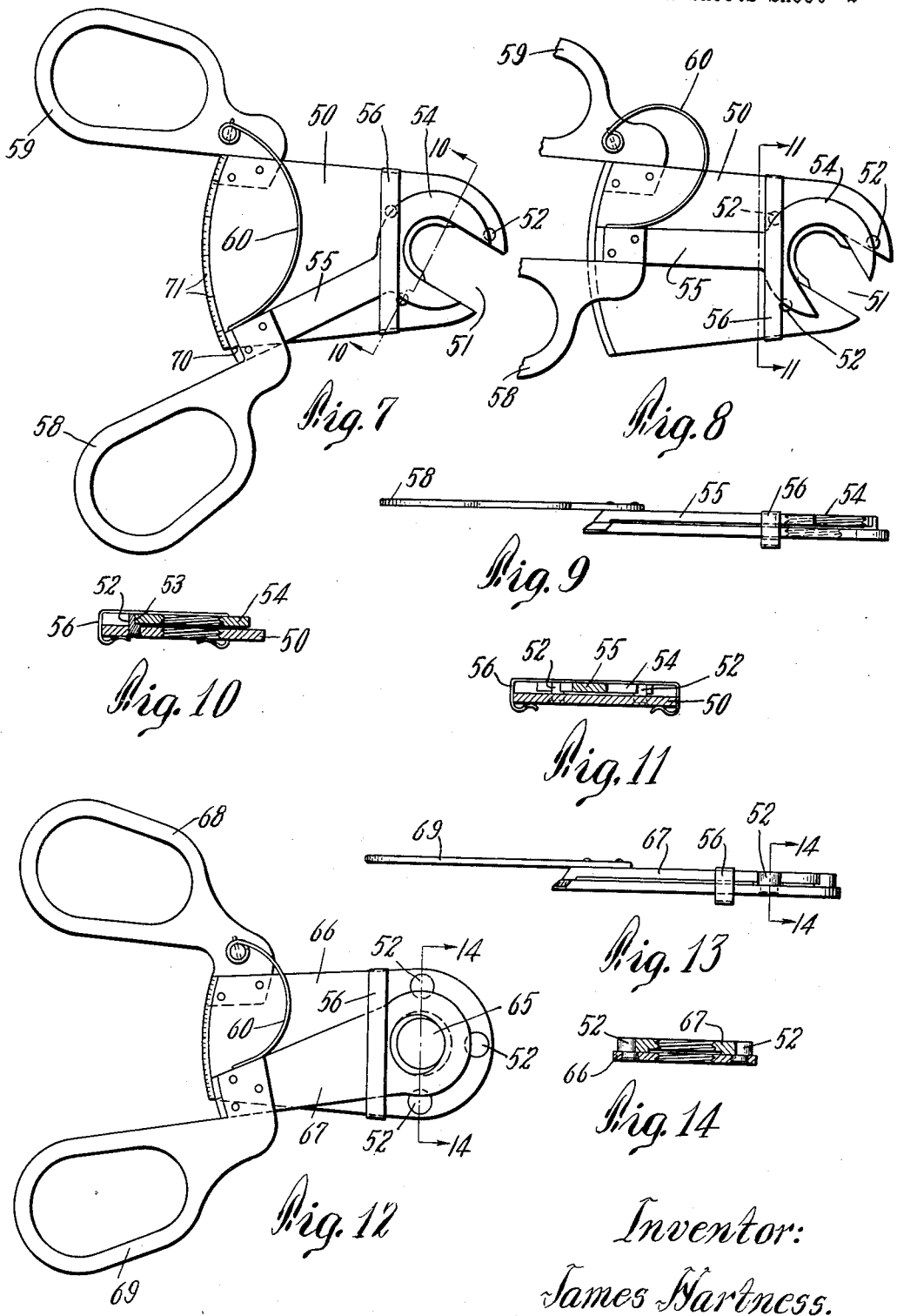

Patented July 11, 1933

1,917,301

UNITED STATES PATENT OFFICE

JAMES HARTNESS, OF SPRINGFIELD, VERMONT

SCREW THREAD GAUGE

Application filed December 11, 1929. Serial No. 413,244.

This invention relates to screw thread gauges.

It is an object of the present invention to provide a simple, practical thread gauge which is convenient, inexpensive, and sufficiently accurate for bench gauging. It is also an object of the invention to provide a gauge which is capable of indicating the presence of errors in pitch diameter and in lead, as well as indicating whether a threaded element is near the border line of rejection. It is a further object of the invention to provide a gauge which can be quickly applied and which in operation presses firmly against a substantial area of flank of the thread under test. To this end the invention may be embodied in a gauge composed of two relatively movable gauging members, each of which has an internal thread portion for engagement with the thread to be tested. The two members may be connected together in a number of ways for controlled relative axial movement when relatively rotated, the thread portions formed on or carried by the members being substantially coaxial and being capable of lying in a common helix. Relative rotation of the two members causes apparent relative axial advance of the thread portions on the members. If a bolt to be tested is brought into threaded engagement with the thread portions of the members when the portions are arranged to lie in a common helix, subsequent relative rotation of the members will cause their thread portions to advance into binding contact with the flanks of the screw under test, unless the apparent relative advance of the thread portions is exactly offset by an equal and opposite bodily advance of the members themselves. Thus, as fully described in my copending applications Serial Nos. 192,236, filed May 18, 1927, and 287,137, filed June 21, 1928, the angles of permitted rotation between the members when in threaded engagement with a screw to be tested indicate the presence and magnitude of errors in pitch diameter and lead. Suitable marks may be made on the members to indicate tolerance zones, so that an operator can tell at a glance whether or not a screw should be rejected, and how near to the border line it is.

The present invention is furthermore characterized by finger-pieces attached to the members by which the gauge may be readily held and operated by one hand, the other hand being free to hold the screw to be tested; also by open sides to the threaded bores in the members to permit insertion of the work laterally. This results in faster gauging than is possible when the screws to be tested must be screwed into the bores of the members axially.

Various additional advantageous features of this invention will be apparent to one skilled in the art, from the description thereof which follows and from the drawings, of which,—

Figure 7 is a modified embodiment of the invention.

Figure 8 is an elevation of the same with the parts in a different position of operation.

Figure 9 is an edge elevation of the same.

Figure 10 is a section on the line 10—10 of Figure 7.

Figure 11 is a section on the line 11—11 of Figure 8.

Figure 12 is a front elevation of another embodiment of the invention.

Figure 13 is a side elevation of the same.

Figure 14 is a section on the line 14—14 of Figures 12 and 13.

Figure 1:
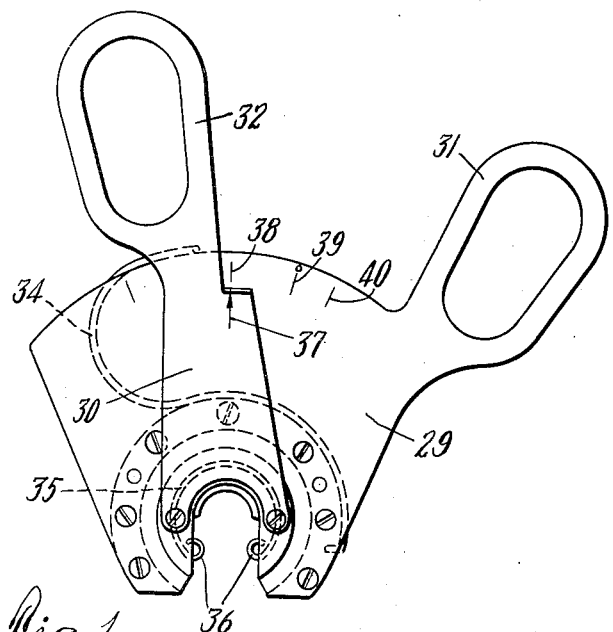
Figure 1 is an elevation of a gauge embodying the invention.

Referring to the form of gauge shown in Figures 1 to 6, the gauge consists essentially of two gauge members 20 and 21. The member 20 is provided with a slot 22 extending inwardly from the periphery thereof and terminating in a semi-circular inner end, the wall of which is screw-threaded as at 23. The member 21 is likewise provided with a slot 24, the inner end of which is semi-circular with its wall screw-threaded as at 25. The slots 22 and 24 are of sufficient size to receive laterally a screw or other equivalent threaded member to be tested. The curvature of the threaded ends 23 and 25 of the respective slots is such as to enable the threads of these semi-circular walls to interfit with the thread of a screw to be tested. The members 20 and 21 are preferably held in face to face relation so that little or no relative axial movement is permitted. These members are also provided with means for retaining them in a coaxial position, that is, coaxial with respect to the semi-circular threaded walls 23, 25. To this end the member 20 may be provided with a flange 26 extending as far as possible around the periphery of the member without closing the slot 22. The member 21 is adapted to fit snugly within the flange 26 so as to rotate therein, but to have no freedom of motion radially. To this end the outer contour of the member 21 is made circular, as is also the inner contour of the flange 26. The member 21 has a reduced concentric portion 27 leaving a flat annular shoulder 28, the surface of which is substantially flush with the under face of the flange 26 when the member 21 is placed against the member 20.

In order to hold these members against relative axial movement, a suitable plate 29 may be secured to the under face of the flange 26, this plate having a circular opening therein to adapt it to fit against the edges of the reduced portion 27, so that the plate thus rests on the shoulder 28 and holds the member 21 against the member 20. An operating arm 30 may be secured to the end face of the reduced portion 27 to facilitate the rotation of the member 21 relative to the member 20. Since the latter is secured to the plate 29, it is obvious that the plate 29 and the arm 30 may be conveniently manipulated to cause relative rotation between the two gauging members. This may be further facilitated by attaching to or forming upon the plate 29 a suitable handle or finger-piece which may be in the form of a loop 31. A thumb-piece, such as a loop 32, may be provided for the arm 30, the loops shown on the drawings being similar to those employed on scissors. By these thumb and finger-pieces the gauge, as a whole, may be readily held and manipulated with one hand, leaving the other hand free to handle the work which is to be tested.

The slots 22 and 24 are capable of moving into a position of registry as shown in Figure 1, the threads 23 and 25 being so cut as to lie in a common helix when the gauge members 21 are together and when the slots are in registry. When the gauge is held thus, a screw to be tested may be inserted laterally so as to engage the threads 23, 25. The gauging members may then be relatively rotated in both directions by manipulation of the finger-pieces 31, 32. The effect of the relative rotation is to close the opening formed by the slots sufficiently to prevent the escape of the screw therefrom until the slots are restored to registry. The relative rotation of the threads 23, 25 results in a relative apparent advance of these threads in opposite directions so that they soon come into binding engagement with the thread under test. This effectively limits the relative rotation of the gauging members at a point depending on the characteristics and dimensions of the thread under test. Thus when the flank thickness or pitch diameter is greater than standard, the possible angle of relative rotatation from the open position will be diminished. On the other hand, if the pitch diameter is less than standard, a greater angle of relative rotation between the gauge members is possible. Thus the angle of rotation from the open position required to bring the threads 23, 25 into binding engagement with the thread under test is a measure of the flank thickness or pitch diameter of the screw under test, provided there is no appreciable lead error in the screw.

Figure 2:
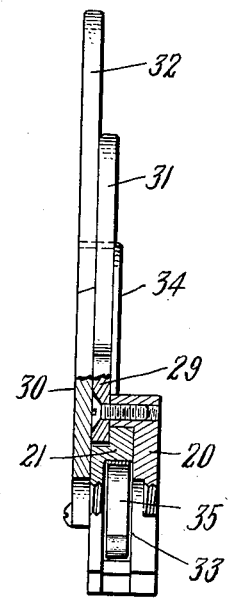
Figure 2 is a side elevation of the same, a portion being broken away to show the parts in section.
Figure 3:
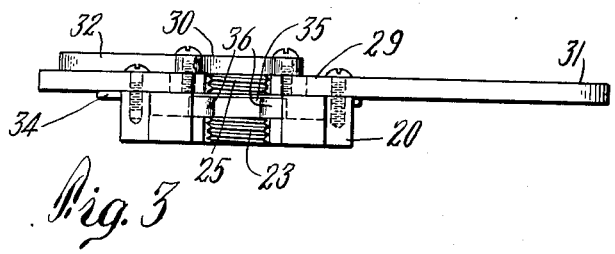
Figure 3 is a bottom plan view of the same.
Figure 5:
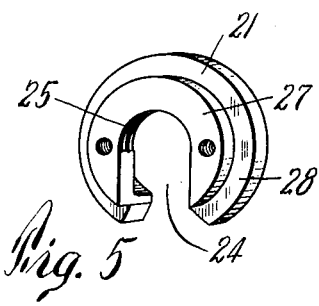
Figures 4, 5 and 6 are perspective views of individual parts of the gauge shown in Figure 1.
Figure 4:
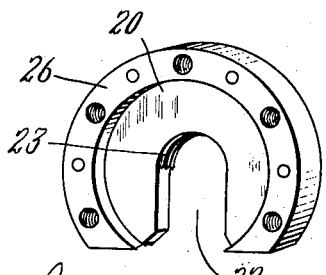
Figure 6:
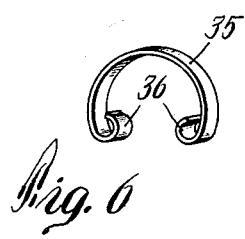

The latter may be detected and provided for by the structure illustrated in Figures 2 and 3. As shown therein, the gauge member 21 is hollowed out as at 33 on the side toward the member 20 so that the thread 25 is spaced from the thread 23. This permits contact of the threads 23, 25 respectively with spaced turns of the thread under test so that a lead error may thus be readily detected and measured, since the magnitude of a lead error is proportional to the number of turns of thread over which the measurement is taken. The effect of a lead error on the action of a gauge of the kind shown in Figure 1 is to make possible a greater angle of relative rotation of the members in one direction from the open position than is possible in the other direction, so that in order to detect lead error the members must be rotated in both directions from the open position in order that the two angles of rotation can be compared. To this end the gauge shown in Figure 1 is constructed in such a way that the members 20 and 21 may be rotated in both directions from the open position.

To facilitate the insertion of screws to be tested, I may provide a suitable spring 34, one end of which is secured to the arm 30 at a convenient point, the other end being secured to the plate 29 or to the member 20. This spring is shaped in such a way that the position of rest of the members of the gauge is as shown in Figure 1. Since it is necessary in moving the members from one extreme to the other to move the slots 22, 24 through their position of registry, it is advantageous to provide resilient means for retaining the screw under test during the manipulation of the gauge members. To this end an arcuate spring 35 may be conveniently inserted in the hollow 33 of the member 21, this spring having its ends 36 curled back with a portion projecting into the slot 24 from opposite sides so that a screw when being pressed into the recess must spring back the curled ends 36 which thus offer a resistance to its passage both in and out of the slot. Thus a screw once inserted in the gauge for measurement is releasably held thereby until forcibly pulled out.

On the plate 29 may be inscribed a number of suitable marks, notches, or other indicia to cooperate with an index 37 on the arm 30. One of the marks 38 on the plate 29 is adapted to indicate the open position of the gauge in which the slots 22, 24 are in registry, other marks 39, 40 being arranged to define a pair of tolerance zones symmetrical on opposite sides of the center mark 38. The marks 39, 40 are so situated that if the limit of movement of the arm 30, when the gauge is in engagement with a screw to be tested, is reached when the index 37 is between the marks 39 and 40, that is, within the zone of tolerance, then the screw under test is acceptable. If, however, the limit of relative rotation of the gauge members is reached when the index 37 is outside of a zone of tolerance, the screw should be rejected.

A somewhat simpler embodiment of the invention is illustrated in Figure 7. This form comprises a plate 50 in which is cut a slot 51, the inner end of which is semi-circular and threaded. The plate 50 is provided with three or more studs 52 which are notched as at 53 to receive the circular end 54 of a gauge member which cooperates with the plate 50. This member 54 is provided with an operating extension or arm 55 and is also slotted as at 51 to register with the slot 51 of the plate 50, as shown in Figure 7. The inner end of the slot of the member 54 is semi-circular and threaded, the threads of this member and of the plate 50 being arranged to lie in a common helix when the members are in the position shown in Figure 7, in which position they are ready to receive a screw to be tested. In order to hold the member 54 in place against the shoulder 53 of the studs 52, I may provide a simple spring 56 which clamps over the opposite side edges of the plate 50 and which bears against the upper surface of the member 54. Suitable finger-pieces such as loops 58, 59 may be provided to facilitate the relative rotation of the members 50, 54. A spring 60 may be secured to the two members so as to hold them resiliently in their open position.

The gauge as illustrated in Figure 7 is capable of one direction of movement only from the open position. Thus this gauge is capable of measuring flank pitch diameter only. When the screw to be tested is inserted in the slot 51, the finger-pieces 58, 59 are drawn together by the operator's thumb and fingers so that the gauge members take positions somewhat as indicated in Figure 8, the arc of relative movement depending on the pitch diameter of the screw under test. Since the threaded portions of the slots 51 are semi-circular the relative rotation of the gauging members causes a partial closure of the slots so that the screw under test is held against the threaded inner ends of the slots 51. The gauging action of the threaded elements is similar to that described hereinbefore in connection with the description of the embodiment of the invention illustrated in Figure 1. This gauge is exceedingly simple and relatively inexpensive. In spite of its simplicity it is reasonably accurate and is easy to manipulate.

The alternative form of gauge is shown in Figure 12, this gauge being substantially like that illustrated in Figure 7 except that instead of an open slot in the gauge members, a bore 65 is provided in the gauging members 66, 67, the bore in each member being threaded to receive a screw to be tested. The gauging members are provided respectively with finger-pieces such as loops 68, 69 by which the relative rotation of the gauging members is facilitated. The threads in the bore 65 are so cut that they lie in a common helix when the gauge members are in their open position, that is, in some such position as that illustrated in Figure 12. The threads of the bore 65 are preferably capable of receiving with an easy fit the largest tolerable screw to be tested so that any screw having a thread within the limits of toleration can be readily screwed into the bore when the gauge is opened. When the gauge is closed, by moving the finger-pieces 68, 69 toward each other, the limit of such motion indicates the pitch diameter of the thread under test and also indicates whether this diameter is near either limit of tolerance. In both the forms shown in Figures 7 and 12, an index 70 may be provided on one of the gauge members in a position to cooperate conveniently with scale markings or zone limit indicators 71 which may be provided on the arcuate edge of the other gauging member.

It will be apparent to one skilled in the art that various further modifications and changes in structure can be made without departing from the scope of the invention as defined in the following claims.

I claim:

1. A screw thread gauge comprising a pair of members relatively revoluble about a common axis, each of said members having a slot with a semi-circular end therein concentric with said axis and threaded to engage a thread to be tested, said members having a relative open position in which the slots register to receive laterally a screw to be tested and in which their threads lie in a common helix, means on said members for maintaining them coaxial during relative revolution about said axis, and means for indicating the angle of relative revolution from said open position.

2. A screw thread gauge comprising a pair of gauging members relatively revoluble about a common axis, each of said members having a slot therein to receive laterally a screw to be tested, said members having helical surfaces at the inner ends of said slots adapted to interengage with the thread of said screw and to lie in a common helix when said slots are alined to receive a screw, means for maintaining said members coaxial, and means cooperating with said gaging members for indicating dimensional characteristics of the screw to be tested.

3. A screw thread gauge comprising a pair of elongated plates slidable on each other, each plate having near one end thereof a concave arcuate edge portion in which is formed a portion of a screw thread, means for maintaining said arcuate edge portions coaxial when the plates slide on each other, a finger loop and thumb piece at the ends of said plates opposite said edge portions, and a spring pressing said finger loop and thumb piece away from each other.

4. A screw thread gauge comprising a pair of elongated plates slidable on each other, each plate having near one end thereof a concave arcuate edge portion in which is formed a portion of a screw thread, and means for maintaining said edge portions coaxial including a plurality of pins projecting from a face of one plate and engaging edge portions of the other plate, and spring means resiliently maintaining said plates in face-to-face engagement.

5. A screw thread gauge comprising a flat plate of substantial length and width having near one end therof a concave arcuate edge portion, a series of pins projecting from one face of said plate and defining a circle concentric with said arcuate edge portion, a second plate slidable on the first said plate and provided with circular edge portions adapted to fit within said series of pins, said second plate having a concave arcuate edge portion coaxial with the concave edge portion of the first said plate, said concave edge portions having screw thread portions capable of lying in a common helix, and a spring clip engaging the mutually remote faces of said plates to hold said plates in face-to-face engagement.

6. A screw thread gauge comprising a pair of gauging members relatively revoluble about a common axis, each member having a slot therein to receive laterally a screw to be tested, said members having semi-circular surfaces at the inner ends of said slots centering on said axis and threaded to interengage with the thread of said screw and to lie in a common helix when said slots are alined to receive a screw, means for maintaining said members coaxial during relative revolution thereof, a finger loop attached to one said member, a thumb-piece attached to the other said member, and a spring resiliently holding said members with said slots alined.

7. A screw thread gauge comprising a pair of gauging members relatively revoluble about a common axis, each member having a slot therein to receive laterally a screw to be tested, said members having semi-circular surfaces at the inner ends of said slots threaded to interengage with the thread of said screw and to lie in a common helix when said slots are alined to receive a screw, means for maintaining said members coaxial during relative revolution thereof, and spring means for resiliently holding a screw against said surfaces for testing.

8. A screw thread gauge comprising a pair of members relatively revoluble about a common axis, each of said members having a slot with a semi-circular end therein concentric with said axis and threaded to engage a thread to be tested, said members having a normal position of relative angularity about said axis in which said slots register to receive laterally a screw to be tested and in which the threads of said slot ends lie in a common helix, means for maintaining said members coaxial, a spring resiliently holding said members in their normal position of relative angularity, and means for resiliently pressing a screw to be tested against the threads of said slots.

9. A screw thread gauge comprising a pair of members relatively revoluble about a common axis, each of said members having a slot terminated by a semi-circular surface concentric with said axis and threaded to engage a thread to be tested, said threaded surfaces being axially spaced, said members having a normal position of relative angularity about said axis in which said slots register to receive laterally a screw to be tested and in which the threads of said surfaces lie in a common helix, means for maintaining said members coaxial, and a bowed spring carried by one of said members between said slots, said spring having end portions yieldably projecting from the sides of said slots whereby a screw under test is yieldably held against the threads of said surfaces.

In testimony whereof I have affixed my signature.

JAMES HARTNESS.